(12) United States Patent
Ahn et al.

(10) Patent No.: US 8,055,717 B2
(45) Date of Patent: Nov. 8, 2011

(54) METHOD AND SYSTEM FOR PROVIDING PERMANENT MAIL SERVICE

(75) Inventors: Jung-Eun Ahn, Gyeonggi-do (KR); Kang-Youl Kim, Gyeonggi-do (KR); Ram Rhee, Gyeonggi-do (KR)

(73) Assignee: NHN Corporation, Seongnam-si (KR)

( * ) Notice: Subject to any disclaimer, the term of this patent is extended or adjusted under 35 U.S.C. 154(b) by 654 days.

(21) Appl. No.: 11/573,396

(22) PCT Filed: Aug. 16, 2005

(86) PCT No.: PCT/KR2005/002668
§ 371 (c)(1),
(2), (4) Date: Feb. 7, 2007

(87) PCT Pub. No.: WO2006/036042
PCT Pub. Date: Apr. 6, 2006

(65) Prior Publication Data
US 2008/0201431 A1    Aug. 21, 2008

(30) Foreign Application Priority Data
Aug. 17, 2004  (KR) .................. 10-2004-0064838

(51) Int. Cl.
*G06F 15/16* (2006.01)
(52) U.S. Cl. ........................ 709/206; 707/671
(58) Field of Classification Search .......... 709/206; 707/661, 667, 671
See application file for complete search history.

(56) References Cited

U.S. PATENT DOCUMENTS

| | | | | |
|---|---|---|---|---|
| 5,890,163 A | * | 3/1999 | Todd | 707/200 |
| 5,973,696 A | * | 10/1999 | Agranat et al. | 715/760 |
| 6,233,582 B1 | * | 5/2001 | Traversat et al. | 707/102 |
| 6,609,138 B1 | * | 8/2003 | Merriam | 707/204 |
| 6,678,705 B1 | * | 1/2004 | Berchtold et al. | 707/204 |
| 6,965,904 B2 | * | 11/2005 | Bankert et al. | 707/104.1 |

(Continued)

FOREIGN PATENT DOCUMENTS

JP       06-250950       9/1994

(Continued)

OTHER PUBLICATIONS

Jeun et al. "A High Performance and Low Cost Cluster-Based E-mail System". [Online] 2003. [Retrieved on May 7, 2009] School of Electrical Engineering and Computer Science, Seoul National University. Retrieved from the Internet: <http://www.springerlink.com/content/al6fqr0xlr5dpngf/fulltext.pdf>.*

*Primary Examiner* — Philip Chea
*Assistant Examiner* — Eric W Shepperd
(74) *Attorney, Agent, or Firm* — H.C. Park & Associates, PLC (57) ABSTRACT

Disclosed is a method and system for storing mail permanently without restriction of storage space of mail box. When user requests to store certain mail permanently, mail server transforms the requested mail data into permanent mail data with predetermined format. The transformed mail data is transmitted to an external server, the external server is a various kind of server that provides personal information storage space. The external server stores received permanent mail data on corresponding user area. If user requests to read permanent mail, the mail server requests the requested permanent mail data to the external server, and the external server transmits the requested permanent mail data to the mail server, by which users can read mails indicated as permanent mail regardless mail capacity of mail box.

9 Claims, 8 Drawing Sheets

U.S. PATENT DOCUMENTS

| | | |
|---|---|---|
| 6,990,527 B2 * | 1/2006 | Spicer et al. .................. 709/229 |
| 7,162,103 B2 * | 1/2007 | Meunier et al. .............. 382/305 |
| 2001/0047388 A1 * | 11/2001 | Kondo et al. ................. 709/206 |
| 2002/0078081 A1 * | 6/2002 | Bierbrauer et al. ........... 707/500 |
| 2002/0112007 A1 * | 8/2002 | Wood et al. ................... 709/206 |
| 2002/0129108 A1 * | 9/2002 | Sykes, Jr. ...................... 709/206 |
| 2003/0028495 A1 * | 2/2003 | Pallante .......................... 705/78 |
| 2004/0221048 A1 * | 11/2004 | Ogier ............................. 709/229 |
| 2005/0015443 A1 * | 1/2005 | Levine et al. ................. 709/204 |
| 2005/0108435 A1 * | 5/2005 | Nowacki et al. .............. 709/246 |
| 2005/0246186 A1 * | 11/2005 | Nikolov ............................. 705/1 |
| 2006/0010213 A1 * | 1/2006 | Mehta ........................... 709/206 |

FOREIGN PATENT DOCUMENTS

| | | |
|---|---|---|
| KR | 2001-0095375 | 11/2001 |
| KR | 2001-103816 A | 11/2001 |
| KR | 2001-109508 A | 12/2001 |
| KR | 1020030094958 | 12/2003 |

* cited by examiner

FIG. 8 ns of International Application PCT Application No. PCT/KR2005/002668 and Korean Patent Application No. 10-2004-0064838 are incorporated herein by reference.

METHOD AND SYSTEM FOR PROVIDING PERMANENT MAIL SERVICE

CROSS REFERENCE TO RELATED APPLICATIONS

This application is a U.S. National Phase Application of International Application PCT Application No. PCT/KR2005/002668 filed on Aug. 16, 2005, which claims the benefit of priority from Korean Patent Application No. 10-2004-0064838 filed on Aug. 17, 2004. The disclosures of International Application PCT Application No. PCT/KR2005/002668 and Korean Patent Application No. 10-2004-0064838 are incorporated herein by reference.

FIELD OF THE INVENTION

The present invention relates to a method and system for providing permanent mail service, more particularly to a method and system for storing a very large volume of user's mails.

BACKGROUND OF THE INVENTION

The electronic mail service is one of most widely used Internet services by users. Most portal sites provide an electronic mail service, and a predetermined mail storage space is provided to each user, by which users can store mails in the limited space.

Web mail service provided by portal sites is a service that can read mails through web browser without a particular user interface or a protocol for receiving mails from a mail server. In conventional web mail service, small size storage space for mail was generally provided, however, request for expansion of mail storage space is increasing more and more.

In case of conventional mail service, because a predetermined mail storage space is given to users, new mails cannot be received if the mailbox reaches over the predetermined size. Therefore, users have to delete unnecessary mails to use the mail service continuously. If there are many mails that users want to store for a long time personally and size of these mails is near the predetermined storage size given to users, users have to delete mails although uses want to store them.

In addition, presently, portal sites provide various services that offer storage space for personal information such as blog, personal homepage, these kinds of personal information storage services are becoming more diversified.

Although the personal information storage services are becoming more diversified, no service that can use personal information storage space in a synthetic way has been provided. Therefore, although there is some storage space left in blog or personal homepage, users still have to delete mail data if there is not enough mail storage space, and mail data cannot be stored in another personal information storage space.

Therefore, although various personal information storage spaces are provided, users cannot utilize each of the storage spaces effectively by controlling storage of personal information. Recently, request for expanding mail storage space is increasing more and more, and it is necessary to store mails to be stored for a long period of time without restriction of storage space.

DETAILED DESCRIPTION OF THE INVENTION

Technical Objects

In order to solve the above-mentioned problems of the prior art, the present invention provides a method and a system that can store mails to be stored for a long time without occupying predetermined mail storage space.

Further, the present invention provides a system and method that can store mail data effectively by inter-operating with an external server that provides personal information storage service.

Technical Solution

According to one embodiment of the present invention, there is provided a system for providing permanent mail service comprising: a mail server for receiving permanent mail storage request information of a particular mail and transforming mail data for which the permanent mail storage is requested into permanent mail data with predetermined format; and an external server for providing personal information storage space and share service, and storing the permanent mail data transmitted from the mail server in storage area of user that requested the permanent mail storage, wherein, when user requests to read the permanent mail, the mail server requests the permanent mail data of user that requested to read the permanent mail to the external server, and the external server transmits the requested permanent mail data to the mail server.

According to another embodiment of the present invention, there is provided a method for providing permanent mail service comprising the steps of: receiving permanent mail storage request information for a particular mail from user; deriving mail data for which permanent mail storage is requested from a mail box; transforming the derived mail data into predetermined format to transmit it to the external server; requesting transmission of the permanent mail data of corresponding user when a permanent mail read request is received from user; and transmitting the permanent mail data of corresponding user received from the external server to user.

MODE OF INVENTION

Hereinafter, the preferred embodiment of the present invention will be described with accompanying drawings.

Figure 1:
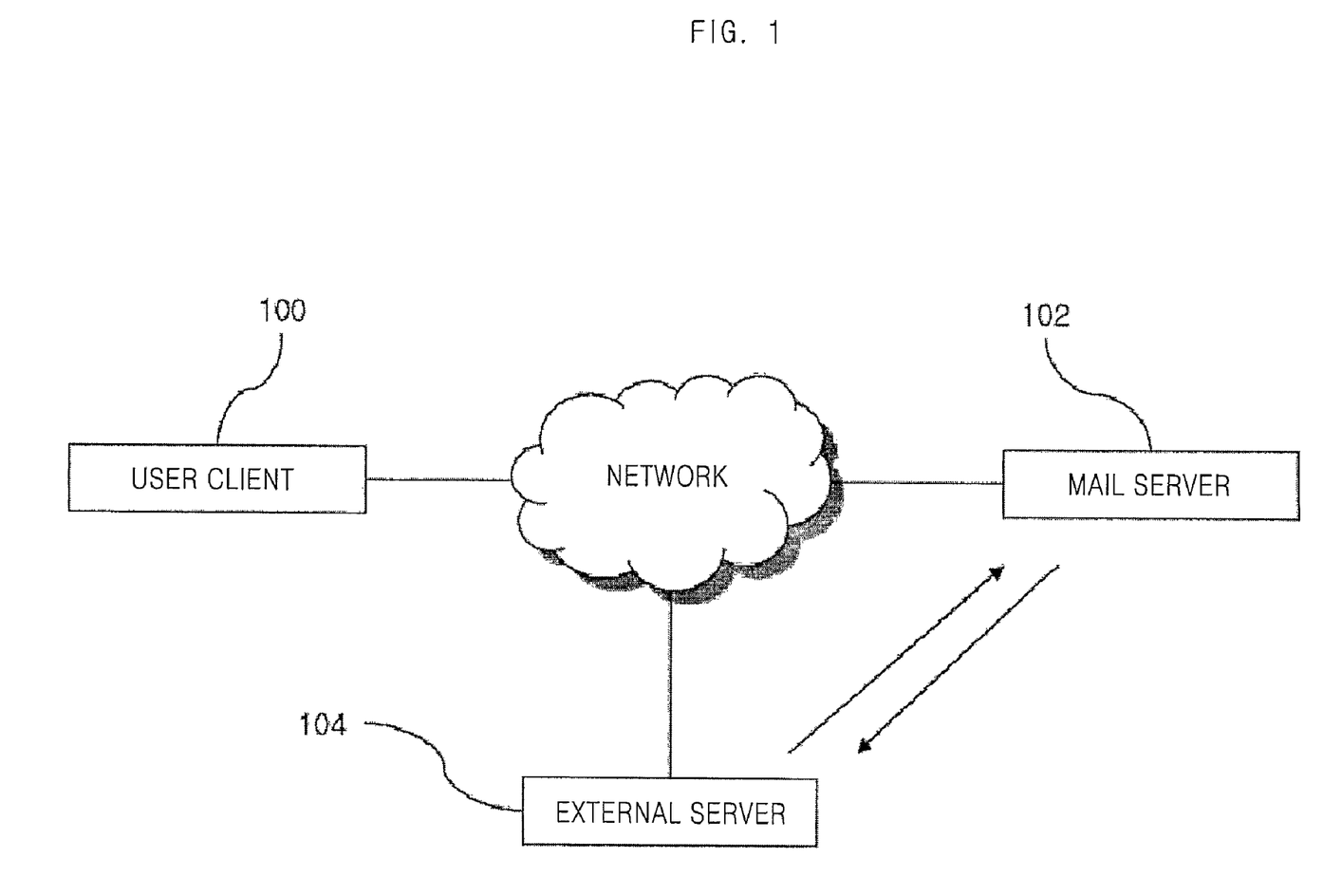
FIG. 1 illustrates a configuration of permanent mail service system according to a preferred embodiment of the present invention.

FIG. 1 illustrates a configuration of the permanent mail service system according to a preferred embodiment of the present invention.

Referring to FIG. 1, the permanent mail service system according to a preferred embodiment of the present invention may comprise a user client 100, a mail server 102 and an external server 104.

In FIG. 1, MUA (Mail User Agent) is installed in the user client. The MUA is a client program for checking mails from a remote mail system through protocols such as POP, IMAP, etc. The present invention is applied to web mails, web browser is generally used as MUA in the web mail service. Besides web browser, mail browser programs such as Outlook Express of Microsoft, Netscape Mail of Netscape can be included in MUA.

When web browser is used as MUA, the web page provided by the mail server 102 provides an icon or menu by which users can request permanent mail storage or permanent mail reading. Users can send request information that stores a certain mail as a permanent mail to the mail server 102 by clicking the icon or using other methods.

Further, the web page provided by the mail server 102 provides a folder or an icon by which users can read mails stored as permanent mail, users can request to read permanent mail using the provided icon or folder.

The mail server 102 receives permanent mail storage request information for a certain mail from user MUA and stores the requested mail permanently in the external server. Further, the mail server receives a permanent mail read request from the user MUA and provides the permanent mail stored in the external server to the user MUA.

As described in the background of the invention, when a mail is stored permanently, the mail occupies mail storage space, and therefore, users cannot use the mail storage space effectively Therefore, the mail server 102 of the present invention stores the mail that user requested to store permanently in another personal storage space.

As described above, portal sites provide other personal storage spaces such as blog, personal homepage besides mail. When a user requests to store a mail as a permanent mail, the mail server 102 transmits the mail to an external server such as blog, homepage, etc., and the external server stores the corresponding mail. Therefore, the mail for which the permanent storage is requested does not occupy any personal mail storage space of the mail server and is stored permanently.

The mail server 102 derives mail for which the permanent storage is requested by user from mailbox to transform the derived mail into a predetermined form and transmit the transformed mail data to the external server.

Further, the mail server 102 receives a permanent mail read request from the user MUA, receives permanent mail data through the communication with the external server where permanent mail is stored, and generates web page where the permanent mail can be read using the received data.

The external server 104 may include the above-mentioned blog server and personal homepage server. It would be obvious to those skilled in the art that other servers can be included in the external server besides the blog server and the personal homepage server.

The external server 104 receives permanent mail storage request information from the mail server and stores the permanent mail data. Generally, in case of the blog service and the personal homepage service, etc., there is a limit for file size that can be stored in a day. However, such services do not limit full storage space unlike mail service. Therefore, when the permanent mail is stored in the personal storage space such as the blog and the personal homepage, the stored permanent mail does not affect use of blog or personal home page storage space as well as use of mail storage space.

When a user requests to read the permanent mail, the external server 104 receives permanent mail transmission request form the mail server 102, and derives corresponding permanent mail data from database to transmit it to the mail server.

Conventionally, portal sites provided various personal information storage services, however, portal sites did not provide ways that users can control the various storage spaces in using the storage spaces. Therefore, when mail storage is full but there is enough space in blog, users could not utilize the storage space of the blog as mail storage space. According to the present invention, as a particular mail is stored in a server which provides another personal information storage service, users can control various storage spaces.

Figure 2:
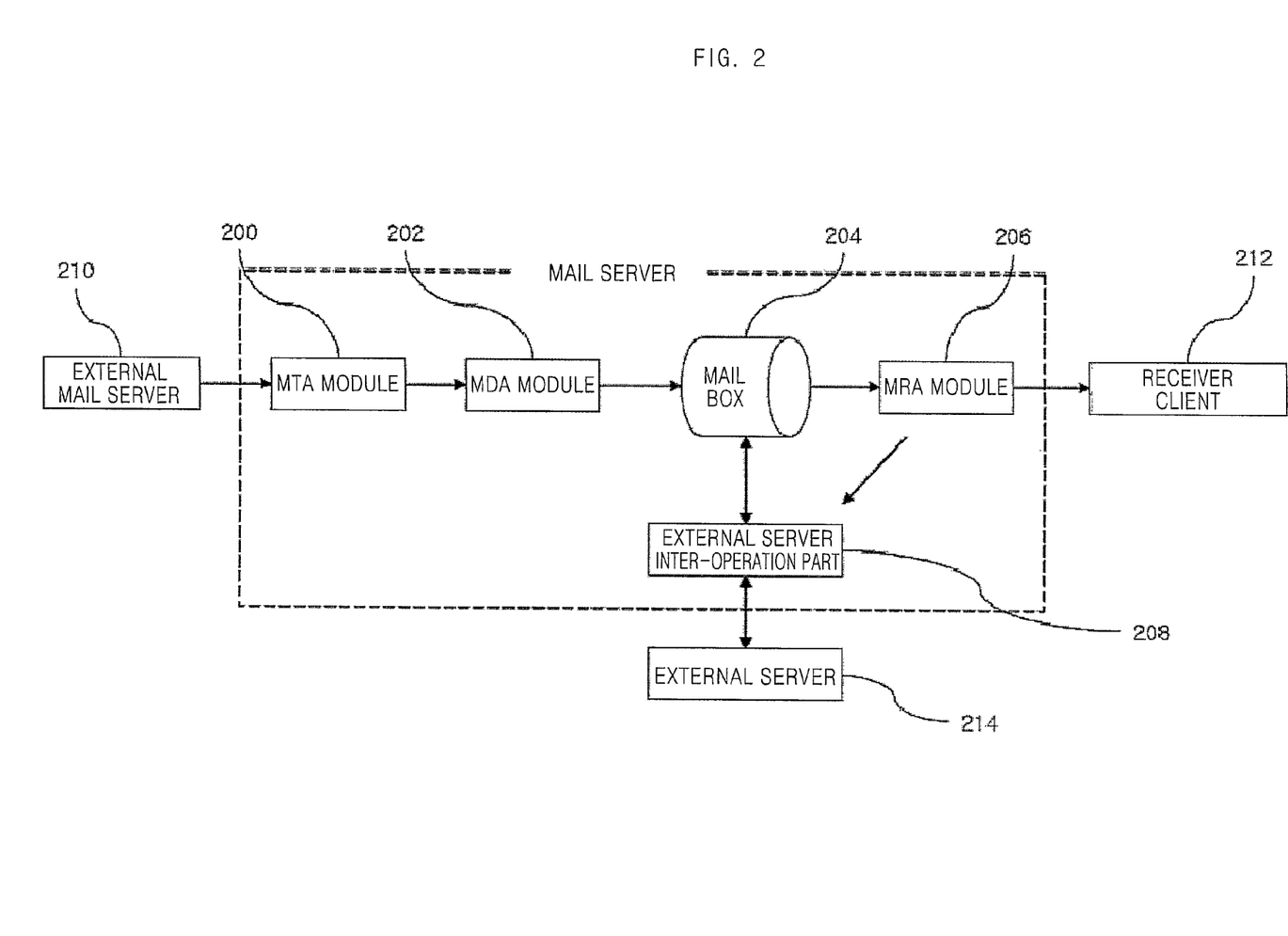
FIG. 2 illustrates configuration of the mail server according to a preferred embodiment of the present invention.

FIG. 2 illustrates a configuration of the mail server according to a preferred embodiment of the present invention.

Referring to FIG. 2, the mail server according to a preferred embodiment of the present invention may comprise a MTA module 200, a MDA module 202, a mail box 204, a MRA module 206 and an external server inter-operation part 208.

In FIG. 2, the MTA module 200 receives electronic mail data from an external mail server 210 or sends mails to MTA of another mail server through a predetermined protocol. Generally, SMTP (Simple Mail Transfer Protocol) is used as the mail transmission protocol. That is, the MTA module 200 calls MDA (Mail Delivery Agent) to transmit the received mail from another MTA or MUA to another MTA or the mail box 204.

The MDA module 202 delivers the mail that the MTA module 200 received. The MDA module 202 delivers mails externally or internally. In case of delivering externally, MDA modules exist for each channel. In case of delivering internally, the received mail is stored in the mailbox of each user.

The mail box 204 is a database for storing electronic mail. In storing electronic mail in mailbox, there are a MBOX method that attaches mails into one file continuously and a method that stores each electronic mail as an independent file in one directory. Other various storage methods can be used, and it would be obvious to those skilled in the art that variation of storage methods does not affect the spirit and scope of the present invention.

The MRA module 206 is a module for users to access and check electronic mails from the outside(or in remote place) via the receiver client 212. The MRA module may include POP3DEAMON, IMAP4 DEAMON, etc.

When a user requests to store a mail as a permanent mail, the external server inter-operation part 208 receives the request information from the MRA module 206 and derives the mail for which the permanent storage is requested to transform it.

Unlike general document files, mail has many headers on account of its own characteristic. The mail that user requests to store permanently is data that will be stored for a long period of time, and therefore, header information such as mail importance degree, contents type is not essential information. If many headers are to be stored, many fields should be formed in database. Although same size data is stored in the database, more storage space is occupied if data is stored in a plurality of fields.

Therefore, the external server inter-operation part 208 derives a predetermined part of mail data from the stored mail data in the mail server and transforms it into a predetermined format.

Figure 3:
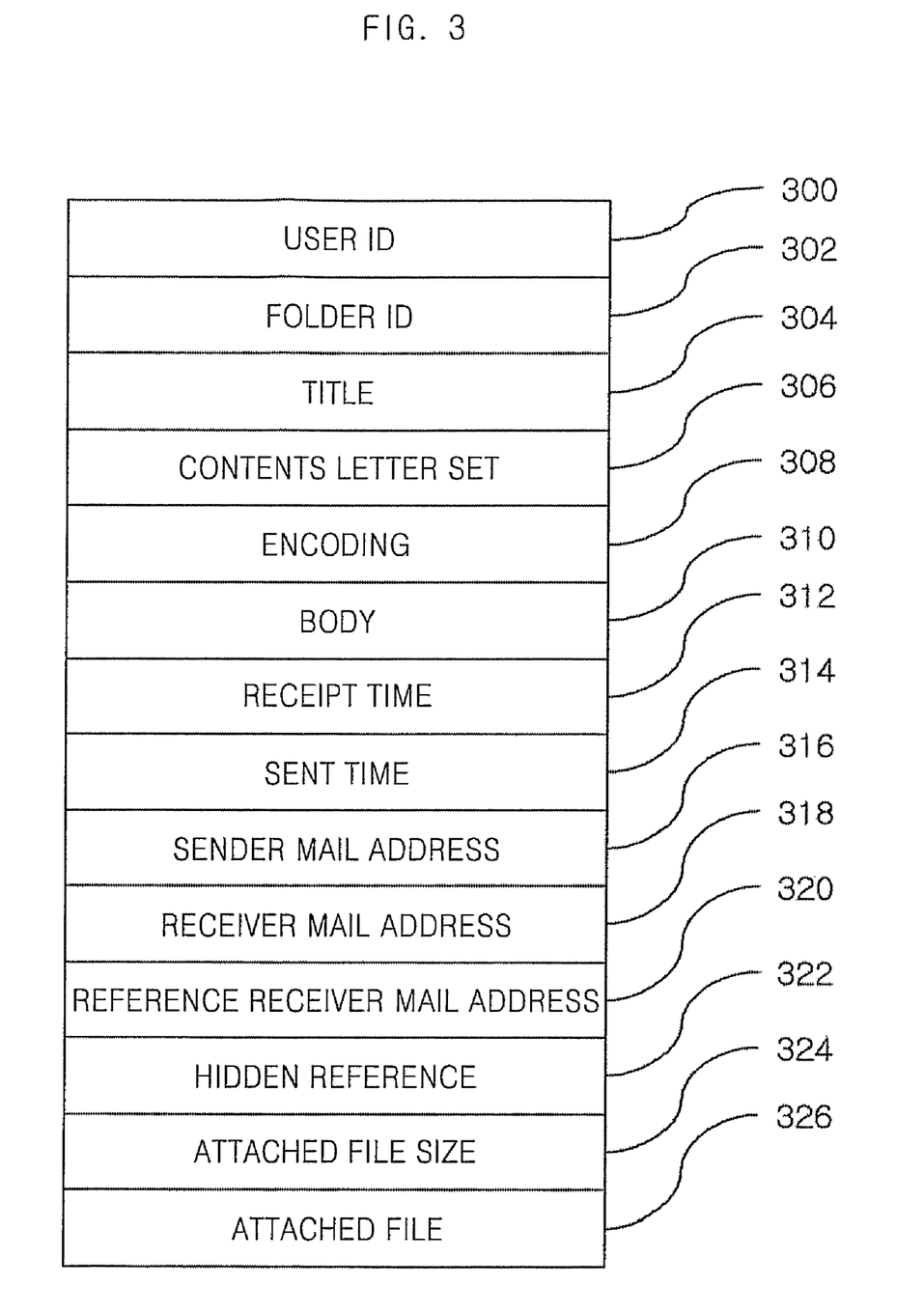
FIG. 3 illustrates permanent mail data format that the external server inter-operation part derives and transforms according to a preferred embodiment of the present invention.

FIG. 3 illustrates a permanent mail data format that the external server inter-operation part derives and transforms according to a preferred embodiment of the present invention.

Referring to FIG. 3, the permanent mail data transformed by the external server inter-operation part may comprises a user ID field 300, a folder ID field 302, a mail title field 304, a mail contents letter set field 306, an encoding exist/non-exist field 308, a mail body field 310, a receiving time field 312, a sending time field 314, a sender mail address field 316, a receiver address field 318, a reference receiver field 320, a hidden reference receiver field 322, an attached file size field 324, and an attached file field 326.

That is, the permanent mail data derived from the external server inter-operation part includes only important field data among fields of general mails. For example, data regarding mail importance degree, data regarding contents type and data made by sender, etc. is not included in the permanent mail data.

Further, the external server inter-operation part 208, when user requests to read the permanent mail, provides the permanent mail to the corresponding user by receiving the permanent mail data stored in the external server 214. The external server inter-operation part provides user ID information to the external server when requesting permanent mail data of a certain user. The web mail page provided by the mail server includes an interface (folder or icon) by which users can request to read the permanent mail.

Figure 4:
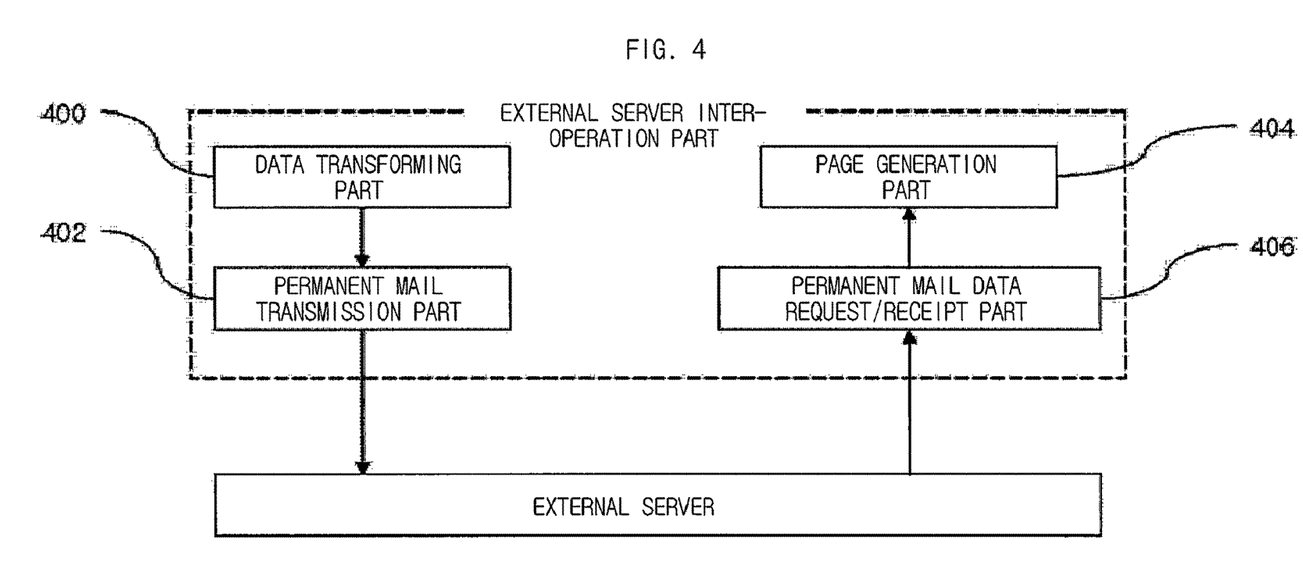
FIG. 4 illustrates a block diagram of the external server inter-operation part according to a preferred embodiment of the present invention.

FIG. 4 illustrates a block diagram of the external server inter-operation part according to a preferred embodiment of the present invention.

Referring to FIG. 4, the external server inter-operation part according to an embodiment of the present invention may comprise a data transforming part 400, a permanent mail transmission part 402, a web page generation part 404, and a permanent mail data request/receipt part 406.

In FIG. 4, the data transforming part 400 derives mail data for which permanent mail storage is requested by a user and transforms the derived mail data into a predetermined format. As described above, the data transforming part 400 forms permanent mail data by deriving only the predetermined field data among a plurality of fields. The field composition of the permanent mail data may be varied according to selection of operator, and it would be obvious to those skilled in the art that these variations would not affect the spirit and scope of the present invention.

The permanent mail transmission part 402 transmits the permanent mail data formed by the data transforming part 400 to the external server. According to a preferred embodiment of the present invention, when the external server is a web server, it is preferable that the permanent mail data is transmitted to the external server through the post method using socket. However, a transmission method is not limited to the post methods, other various transmission methods can be used.

The permanent mail transmission part 402 inquires the external server if the external server has enough space to store the permanent mail, and transmits the permanent mail data when there is enough space. When inquiring state of the external server, Get method using socket can be used, where user ID information and permanent mail data size are used for parameters.

The permanent mail data request/receipt part 406 requests the permanent mail data to the external server to receive it when a user requests to read the permanent mail. The permanent mail data request/receipt part 406 can request the permanent mail data through Get method using socket.

The web page generation part 404 generates a permanent mail read page using the permanent mail data received by the permanent mail data request/receipt part 406. As described above, as some fields are omitted in the permanent mail data compared with general mail data, the web page may be different from general mail read pages.

Figure 5:
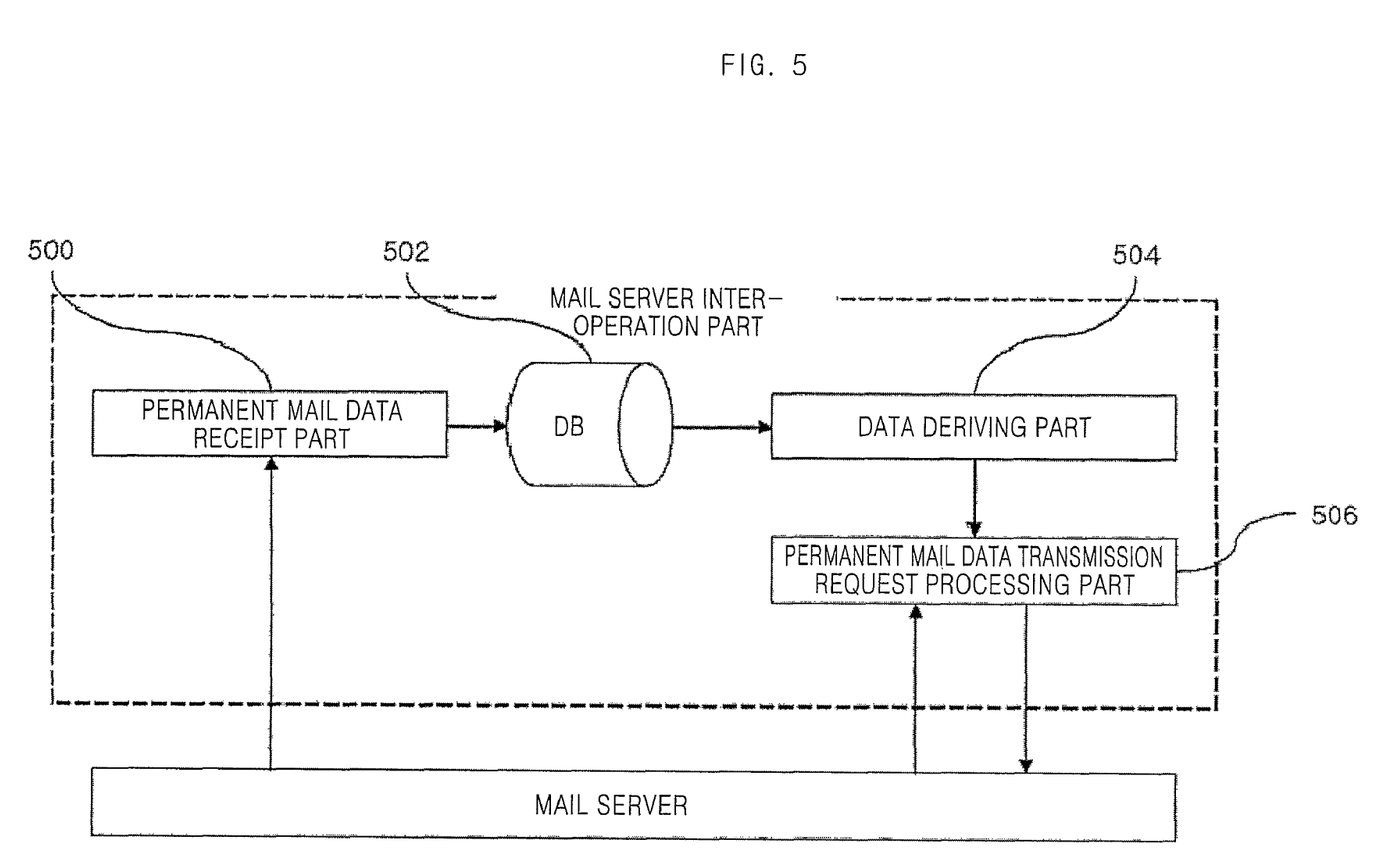
FIG. 5 illustrates a block diagram of the mail server inter-operation part according to a preferred embodiment of the present invention.

FIG. 5 illustrates a block diagram of the mail server inter-operation part according to a preferred embodiment of the present invention.

Referring to FIG. 5, the mail server inter-operation part may comprise a permanent mail data receipt part 500, a database 502, a data deriving part 504, and a permanent mail data transmission request processing part 506.

The permanent mail data receipt part 500 receives the permanent mail data transmitted from the mail server and stores the received data in the database 502. As described above, the permanent mail data is transmitted to the permanent mail data receipt part through the post method. The permanent mail data receipt part checks user identification information of the transmitted data and stores the data on the field of corresponding user in the database.

The database 502 stores the permanent mail data for each user. It is preferable that the database has same fields as the permanent mail data transformed by the mail server and stores the permanent mail data in the corresponding field. When the external server is a blog server, the permanent mail data field may be added in each user field and fields corresponding to the permanent mail data are generated as sub-filed of the added field, and the permanent mail data may be stored in the corresponding field. By storing the permanent mail data in the database of the blog server, users can also read the permanent mail in the blog page.

As shown in FIG. 5, when the permanent mail read request of certain user is transmitted from the mail server, the permanent mail transmission request processing part 506 delivers the request to the data deriving part 504 and transmits the permanent mail data provided from the mail deriving part 504 to the mail server.

The permanent mail transmission request processing part 506 determines if the request is permanent mail list request or permanent mail body request, transmits the determined information to the data deriving part 504, and receives a permanent mail list or permanent mail body to transmit it to the mail server.

The data deriving part derives the permanent mail list or permanent mail body in response to the request of the permanent mail transmission request processing part 506. When communication protocol between the mail server and the external server is predefined, the data deriving part 504 may transform the derived data into format corresponding to the predefined protocol.

Figure 6:
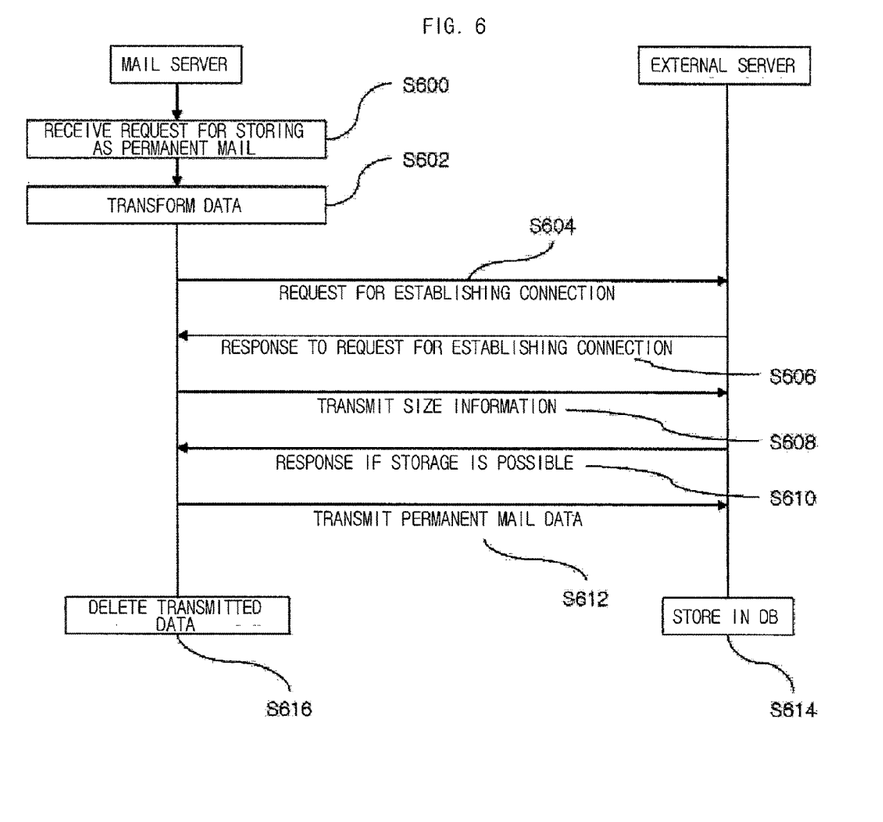
FIG. 6 illustrates a flow chart for storing the permanent mail data in the external server according to a preferred embodiment of the present invention.

FIG. 6 illustrates a flow chart for storing the permanent mail data in the external server according to a preferred embodiment of the present invention.

Referring to FIG. 6, the mail server receives a permanent mail storage request from users S600.

Figure 8:
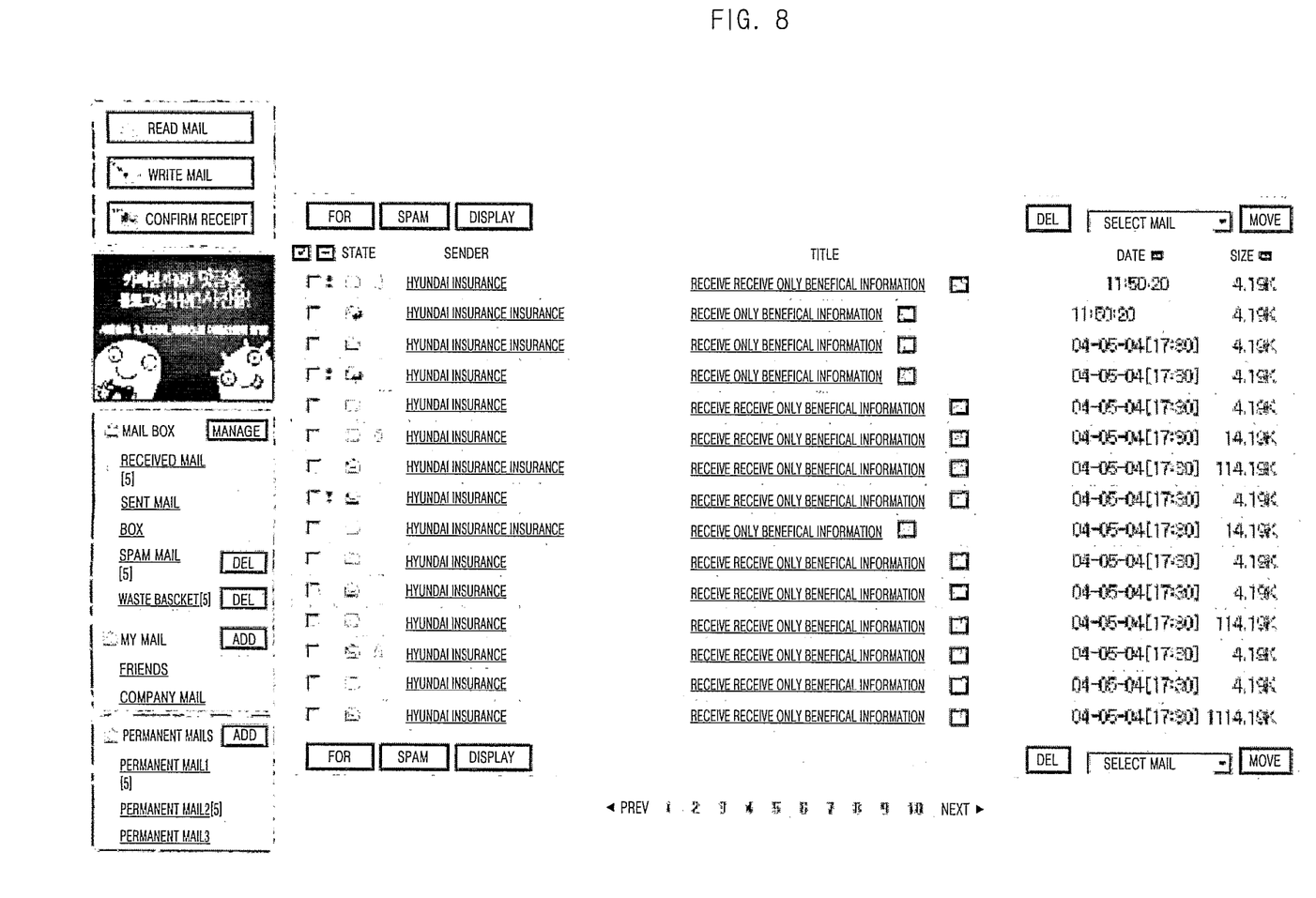
FIG. 8 illustrates an example of web page that provides permanent mail storage function.

FIG. 8 illustrates an example of web page that provides a permanent mail storage function. Users can check mail to be stored as a permanent mail in the web page shown in FIG. 8 and can request storage of the permanent mail to the web server using the mailbox selection menu located in the upper part of the web pace.

The mail server that received permanent mail storage request derives necessary mail data information from the mailbox and transforms it into the predetermined data format S602.

In order to transmit the transformed permanent mail data, the mail server requests connection establishment to the external server S604, and establishes connection with the external server by receiving connection establishment response information S606. The mail server performs general TCP connection establishment with the external server.

After connection is established with the external server, the mail server transmits ID information on user that requested permanent mail storage and permanent mail data size information to the external server S608.

After receiving user ID information and size information, the external server determines if enough space to store the permanent mail remains for corresponding user and transmits response information to the mail server in order to inform the mail server if permanent mail storage is possible S610.

If there is enough space to store the permanent mail, the mail server transmits the transformed permanent mail data to the external server S612. As described above, as data with the predetermined form is transmitted, the permanent mail data can be transmitted through post method.

The external server stores the transmitted permanent mail data in the database S614, and the mail server deletes the mail data which is transformed into the permanent mail data S616. As the mail data which is set to be the permanent mail data by user is no more stored in the mail box, the corresponding mail data does not occupy the storage space of the mail box.

Figure 7:
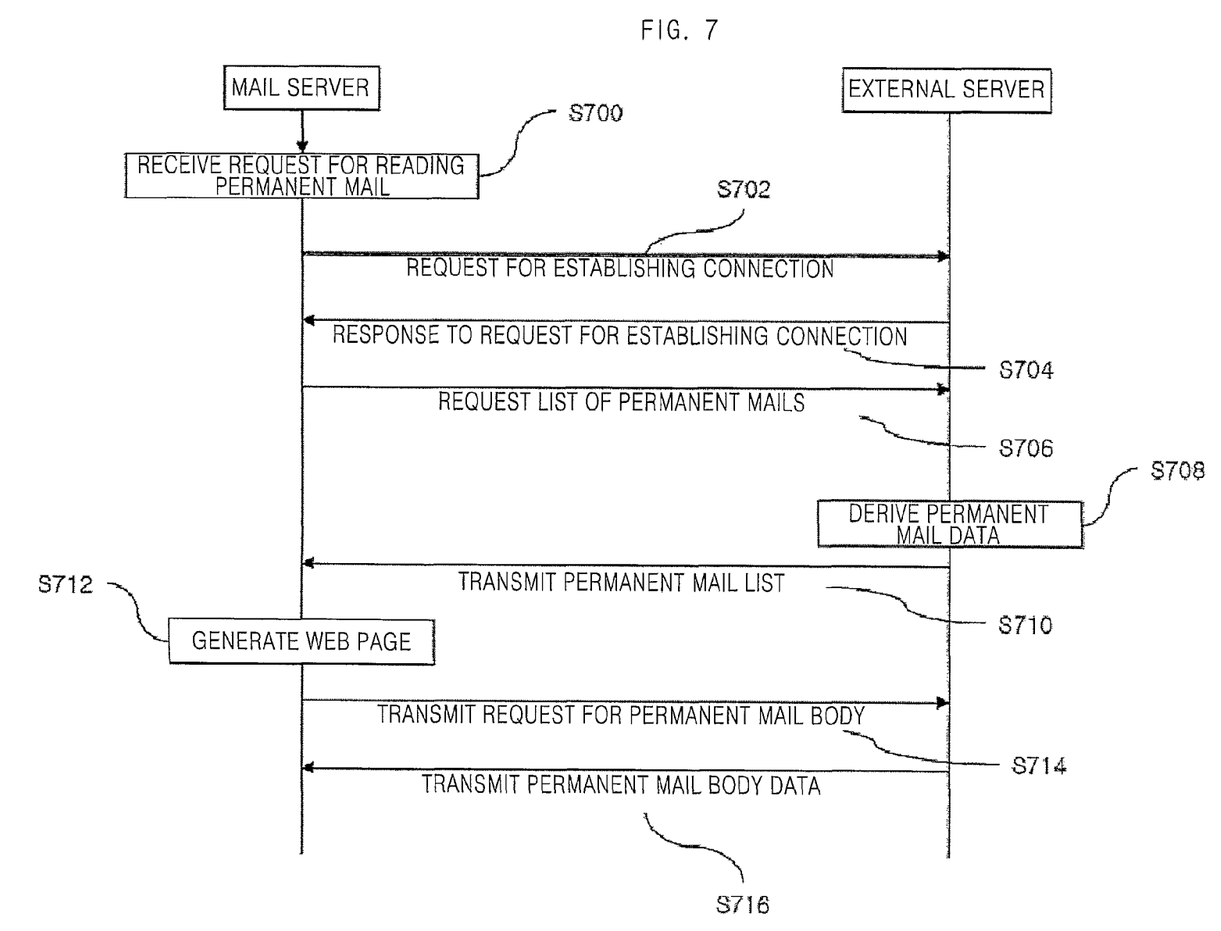
FIG. 7 illustrates a flow chart for providing the permanent mail stored in the external server to users through the mail server according to a preferred embodiment of the present invention.

FIG. 7 illustrates a flow chart for providing the permanent mail stored in the external server to users through the mail server according to a preferred embodiment of the present invention.

Referring to FIG. 7, the mail server receives a permanent mail read request from a user S700.

As shown in FIG. 8, the web page that provides permanent mail function provides a permanent mail for requesting permanent mail read in the left part of the web page, and users can request permanent mail read by clicking the permanent mail menu.

After receiving the permanent mail read request, the mail server requests connection establishment to the external server S702, and receives response information on connection establishment to establish connection with the external server S704.

After connection is established with the external server, the mail server requests a permanent mail list of corresponding user to the external server S706. As described above, the user ID information can be used as a parameter in requesting permanent mail list, and other identification information can also be used.

The external server that received the permanent mail list request derives the permanent mail list of corresponding user S708, and transmits the derived permanent mail list to the mail server S710.

The mail server generates a web page that displays the permanent mail list using the received list information to transmit the web page to corresponding user S712. User can request body of a certain mail among mails of the mail list through the provided web page, and the request information of user is transmitted to the external server S714. In requesting mail body, user ID information and selected permanent mail identification information can be included.

The external server that received the permanent mail body request derives body of the permanent mail corresponding to ID information included in the request information to transmit it to the mail server S716. When any attachment file is included in the request permanent mail, the external server may transmit the attachment file together to the mail server, otherwise, the external server may transmit the link information of the attachment file to the mail server.

As used in this application, the term "module" is intended to refer to, but is not limited to, a software or hardware component, which performs certain tasks. A module or component may advantageously be configured to reside on the addressable storage medium and configured to execute on one or more processors. Thus, a module or component may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

INDUSTRIAL APPLICABILITY

As described above, according to the preferred embodiments of the permanent mail service providing system and methods, mails that users want to store for a long period of time can be stored without occupying mail storage space of a mailbox.

Further, according to the above-described embodiments, as the mail server inter-operates with the external server that provides other personal information storage services, the mail storage space can be increased substantially and user's personal information can be stored distributively in various storage spaces.

The invention claimed is:

1. A storage system for providing web-based electronic mail service comprising:
  a mail server configured to:
    communicate with a plurality of client computers coupled to the mail server over the Internet;
    receive a request for permanent mail storage of an e-mail from a users; and
    transform original mail data of the e-mail into a permanent storage format; and
  an external server coupled to the mail server, configured to:
    provide a storage area for the user, assigned for at least one of a blog service and a personal homepage service;
    create a permanent mail field and subfields corresponding to fields of the permanent storage format, in the storage area for the user; and
    store the transformed mail data in the corresponding created permanent mail field and subfields,
  wherein, in response to a request for retrieving an e-mail stored in the external server, the external server transmits mail data of the requested stored e-mail to the mail server, and
  the mail server comprises:
    a data transforming part configured to derive field data from a portion of an e-mail and transform the derived field data into the permanent storage format;
    a permanent mail transmission part configured to determine whether there is available storage space in the storage area assigned for the at least one of the blog service and the personal homepage service, for storing the e-mail through communication with the external server and transmit the transformed mail data to the external server in response to determining there is available storage space in the storage area; and
    a permanent mail data request/receipt part configured to request permanent mail list information or permanent mail body information for the user from the external server, in response to a request of the user for retrieving an e-mail stored in the external server and, transmit user ID information and mail ID information to the external server, when requesting permanent mail body information.

2. The system of claim 1, wherein the mail server further comprises:
  a mail transfer agent (MTA) module configured to receive e-mails from other mail servers or to transmit emails to MTA modules of other mail servers;
  a mail delivery agent (MDA) module coupled to the MTA module to process the received e-mails from the MTA module;
  a mail box coupled to the MDA module to store the received e-mails for each user according to control of the MTA module;
  a mail retrieval agent (MRA) module to allow users to access the mail server from a remote place; and
  an external server inter-operation part configured to transform the original mail data into the permanent storage format.

3. The system of claim 1, wherein the permanent mail transmission part transmits the user ID information and a permanent mail data size to the external server in order to determine if there is available storage space for permanent mail data.

4. The system of claim 1, wherein the external server is selected from a group consisting of a blog server and a personal homepage server.

5. The system of claim 4, wherein the external server is a blog server.

6. The system of claim 1, wherein the external server comprises:
  a permanent mail data receiving part configured to receive the transformed mail data transmitted from the mail server and to determine user information of the received mail data;
  a database coupled to the permanent mail data receiving part configured to store the received mail data for each user according to control of the permanent mail data receiving part;
  a permanent mail data transmission request processing part configured to receive permanent mail list transmission request information or permanent mail body transmission request information from the mail server and transmit corresponding permanent mail information to the mail server; and
  a data deriving part configured to derive permanent mail data list or permanent mail body data according to a received request of the permanent mail data transmission request processing part.

7. The system of claim 1, wherein the mail server deletes the transformed mail data for which the permanent storage is requested after transmitting the transformed mail data for which the permanent storage is requested to the external server.

8. The system of claim 1, wherein data regarding at least one of a degree of importance and a type of content is excluded from the e-mail in the permanent storage format.

9. The system of claim 1, wherein the storage area is assigned for the blog service for the user.

* * * * *